Oct. 4, 1932.          A. B. MULLIN          1,880,462
                         MOLD SEPARATOR
              Filed April 14, 1930    3 Sheets-Sheet 3
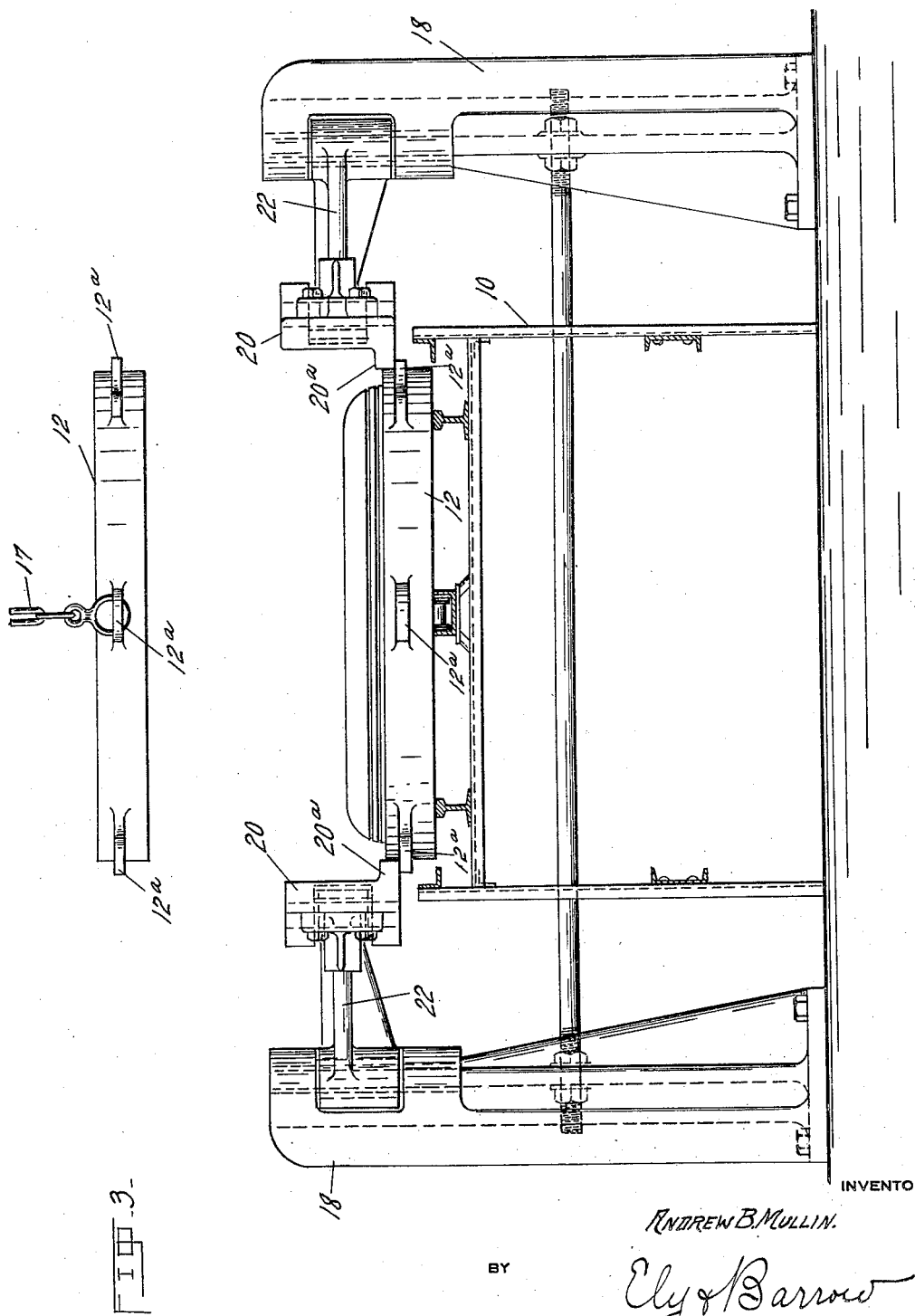
INVENTOR
ANDREW B. MULLIN.
BY
Ely & Barrow
ATTORNEYS.

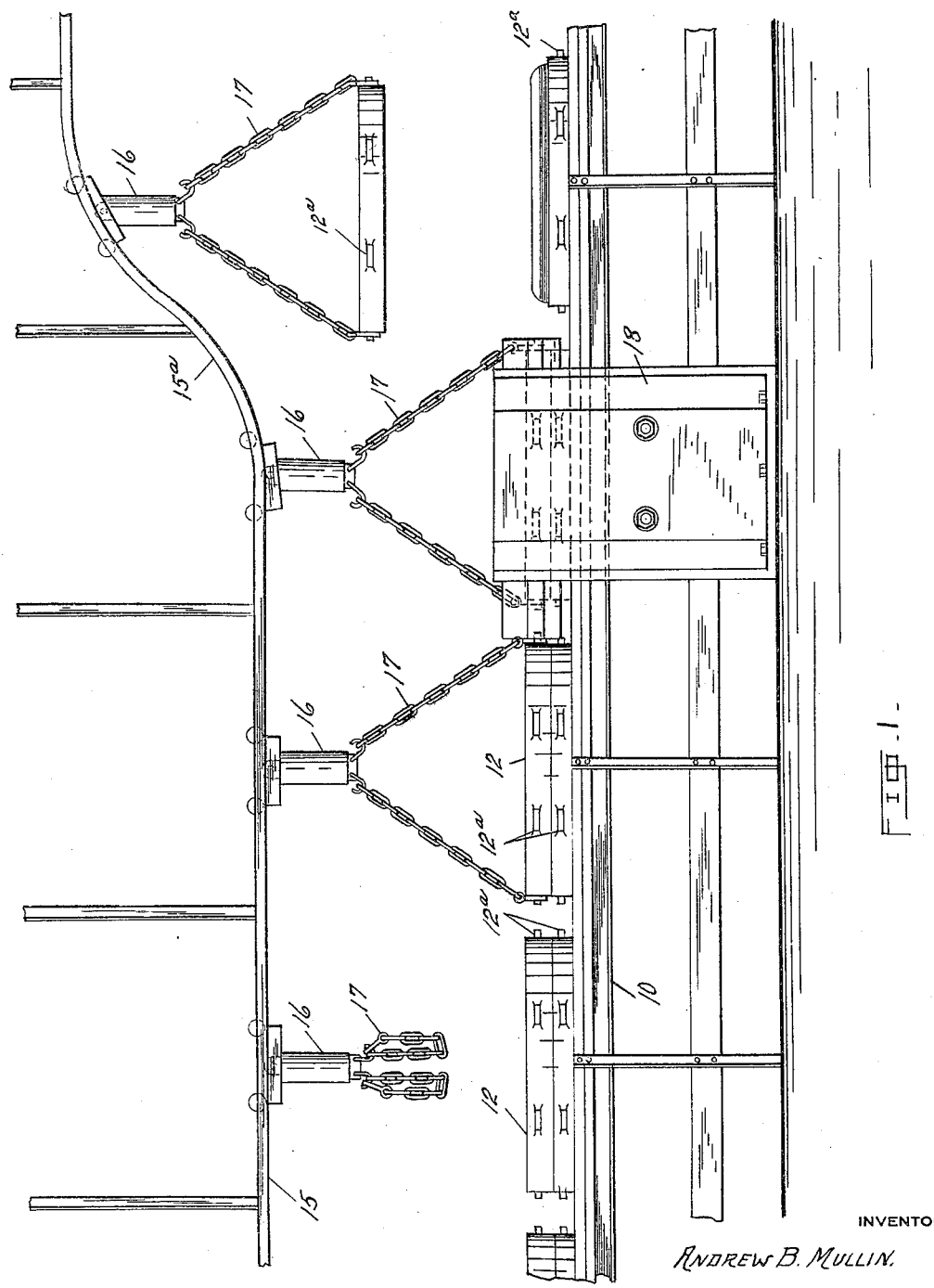

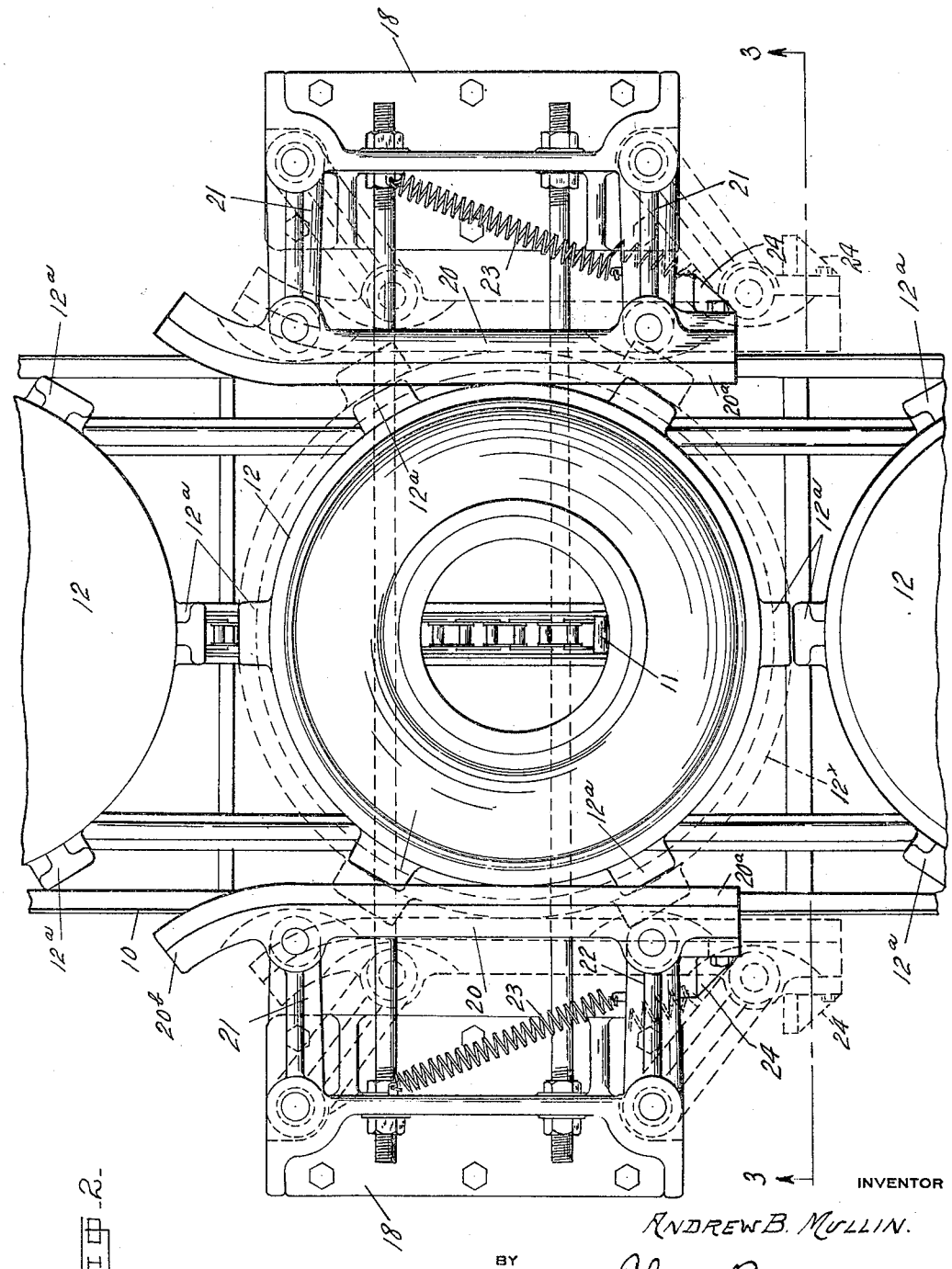

Patented Oct. 4, 1932

1,880,462

UNITED STATES PATENT OFFICE

ANDREW B. MULLIN, OF AKRON, OHIO, ASSIGNOR TO THE FIRESTONE TIRE & RUBBER COMPANY, OF AKRON, OHIO, A CORPORATION OF OHIO

MOLD SEPARATOR

Application filed April 14, 1930. Serial No. 444,033.

This invention relates to means for separating split molds after the molding operation where the molds are carried by a conveyor.

It is an object of the invention to provide simple, inexpensive, efficient means in conjunction with a conveyor for positively separating split molds, such as tire molds, carried on the conveyor.

The above and other objects of the invention are achieved by the apparatus illustrated in the accompanying drawings and described below, it being understood that the invention is not limited to the exact form thereof shown and described.

In the drawings:

Figure 1 is a side elevation of an embodiment of the invention.

Figure 2 is a plan view of the means for retaining the lower mold half on the conveyor.

Figure 3 is a sectional view of the means of Figure 2 taken on line 3—3 thereof.

The numeral 10 indicates a conveyor of any standard form having spaced lugs 11 thereon which engage in the central openings of a plurality of split tire molds 12 carried on the conveyor 10 to positively move the molds therewith. The molds 12 are provided with a plurality of radially extending lugs $12^a$ as is customary in the art.

A second conveyor 15 is provided directly above the conveyor 10 and moves at the same speed thereas. Secured to the conveyor 15 at points over the center of the molds 12 of the lower conveyor 10 are a plurality of members 16 carrying chains 17.

Brackets 18 on opposite sides of the conveyor 10 carry holders 20 through the agency of arms 21 and 22 which are pivotally attached to both the bracket and the holder. Springs 23 whose action is limited by stops 24 on the holders are provided to yieldably hold the arms 21 and 22 and the holders 20 in a direction opposite to the travel of the conveyor. Tie rods 25 may be incorporated in the structure as shown in Figure 3 to strengthen it.

The holders 20 are formed with ribs $20^a$ under which the lugs $12^a$ of the lower mold halves are adapted to engage. The front of the holders are curved as at $20^b$ to allow them to adapt themselves to different sized molds.

Immediately above the station where the lower half of the molds 12 are held down by the holders 20 the upper conveyor 15 takes a rise $15^a$ as illustrated in Figure 1.

In operation, the molds 12 coming from the vulcanizing presses are placed on the conveyor 10 whose lugs 11 engage in the central openings in the molds to continuously move them along the conveyor. Although the invention contemplates cracking and opening the molds directly by the apparatus described herein, the molds are preferably cracked or opened somewhat before they reach the apparatus comprising the invention. As the molds pass along the conveyor an operator hooks the chains 17 carried by the members 16 of the upper conveyor 15 to diametrically opposite lugs $12^a$ on the upper mold half. The lugs of the lower mold half engage under the ribs $20^a$ on the holders 20 which give against the action of the springs 23 so that molds of different sizes may be handled. At this time the rise of the upper conveyor 15 lifts the top mold half off the lower from which the vulcanized tire can then be removed. Molds of larger diameter such as indicated at $12^x$ will cooperate with the yieldable holders 20 as illustrated in dotted lines in Figure 2.

While the invention has been described particularly with respect to tire molds it is evident that the principles thereof may be employed with numerous shapes and sizes of molds adapted to form a plurality of articles.

As many changes could be made in the construction, it is intended that all matter contained in the above description or shown in the accompanying drawings shall be interpreted as illustrative only and not in a limiting sense, accordingly various modifications and applications of the invention can be resorted to without departing from the spirit of the invention or the scope of the appended claims.

What is claimed is:

1. In combination, a pair of superimposed conveyors, split molds comprising upper and lower portions removably carried on the lower conveyor, laterally extending lugs on the respective portions of said molds, means on said upper conveyor adapted to removably engage with the upper mold portions, a pair of members on opposite sides of the conveyor at one point thereof yieldably urged against the sides of the bottom mold portion and over the lugs thereon to prevent said lower mold portion from moving upwardly, and a rise in said upper conveyor above said last-named means, whereby said upper mold engaging means will be raised to separate the two mold portions.

2. In combination, a continuously movable conveyor, molds removably carried thereon and comprising upper and lower portions, laterally extending lugs on said mold portions, means for lifting said upper mold portions from the lower mold portions, and means for holding the lower mold portions on the conveyor during the operation of said last-named means, said means comprising holders yieldably held on opposite sides of the conveyor and having lateral ribs extending above the lugs on the bottom mold portion.

3. In combination, a continuously movable conveyor, molds removably carried thereon and comprising upper and lower portions, means for lifting said upper mold portions from the lower mold portions, a pair of brackets at opposite sides of the conveyor, a pair of arms pivotally supported for horizontal movement on each bracket, horizontally positioned, substantially parallel holders pivotally attached at the ends of each pair of said arms, yieldable means normally urging said holders toward their innermost position and in a direction opposite to the travel of the conveyor, and means on said holders engageable with said lower mold portion to retain it on the conveyor during the operation.

4. In combination, a continuously movable conveyor, molds removably carried thereon and comprising upper and lower portions, laterally extending lugs on said mold portions, means for lifting said upper mold portions from the lower mold portions, a pair of brackets at opposite sides of the conveyor, a pair of arms pivotally supported for horizontal movement on each bracket, horizontally positioned, substantially parallel holders pivotally attached at the ends of each pair of said arms, yieldable means normally urging said holders toward their innermost position and in a direction opposite to the travel of the conveyor, and means on said holders engageable with said lower mold portion to retain it on the conveyor during the operation of the upper mold portion lifting means.

5. In combination, a continuously movable conveyor, molds removably carried thereon and comprising upper and lower portions, laterally extending lugs on said mold portions, means for lifting said upper mold portions from the lower mold portions, a pair of brackets at opposite sides of the conveyor, a pair of arms pivotally supported for horizontal movement on each bracket, horizontally positioned, substantially parallel holders pivotally attached at the ends of each pair of said arms, yieldable means normally urging said holders toward their innermost position and in a direction opposite to the travel of the conveyor, and ribs on said holders engageable with lugs on said lower mold portion to retain it on the conveyor during the operation of the upper mold portion lifting means.

6. In combination, a continuously movable conveyor, molds removably carried thereon and comprising upper and lower portions, laterally extending lugs on said mold portions, means for lifting said upper mold portions from the lower mold portions, a pair of brackets at opposite sides of the conveyor, a pair of arms pivotally supported on each bracket, holders pivotally attached at the ends of each pair of said arms, yieldable means normally urging said holders toward their innermost position and in a direction opposite to the travel of the conveyor, and means on said holders engageable with said lower mold portion to retain it on the conveyor during the operation of the upper mold portion lifting means.

ANDREW B. MULLIN.